(12) United States Patent
Rose

(10) Patent No.: US 7,775,695 B1
(45) Date of Patent: Aug. 17, 2010

(54) RETRACTABLE ROTATIONALLY ADJUSTABLE LIGHTING ASSEMBLY AND METHOD

(76) Inventor: Lance Rose, 4853 W. Sunny Slopes Rd., Worley, ID (US) 83876-9733

( * ) Notice: Subject to any disclaimer, the term of this patent is extended or adjusted under 35 U.S.C. 154(b) by 202 days.

(21) Appl. No.: 12/079,447

(22) Filed: Mar. 28, 2008

(51) Int. Cl.
*B60Q 1/06* (2006.01)

(52) U.S. Cl. ............... 362/493; 362/524; 362/527; 362/543; 362/269; 362/285

(58) Field of Classification Search ............ 362/493, 362/522, 524, 527, 543, 269, 285, 286, 287, 362/419, 420, 423, 427, 428
See application file for complete search history.

(56) References Cited

U.S. PATENT DOCUMENTS

| | | | | |
|---|---|---|---|---|
| 4,707,014 A | * | 11/1987 | Rich | 296/180.1 |
| 4,722,030 A | * | 1/1988 | Bowden | 362/493 |
| 4,787,665 A | * | 11/1988 | Rich | 296/180.1 |
| 5,171,083 A | * | 12/1992 | Rich | 362/493 |
| 5,311,411 A | * | 5/1994 | Garolfi | 362/493 |
| 5,450,296 A | * | 9/1995 | McHugh | 362/525 |
| 5,481,441 A | * | 1/1996 | Stevens | 362/35 |
| 5,743,635 A | * | 4/1998 | Hulse et al. | 362/385 |
| 6,067,012 A | * | 5/2000 | Harding | 340/472 |
| 7,147,353 B2 | * | 12/2006 | Lin | 362/486 |
| 2008/0310178 A1 | * | 12/2008 | Stein | 362/493 |

* cited by examiner

Primary Examiner—Ismael Negron

(57) ABSTRACT

A multi-functional vehicle lighting assembly includes a controller, an housing, a plurality of light-emitting sources, a mechanism for selectively pivoting the light-emitting sources, and a mechanism for selectively swiveling the light-emitting sources along clockwise and counter clockwise directions when the light-emitting sources are adapted to the vertical position. The swiveling mechanism further includes a ball and socket coupling and a support beam with axially opposed proximal and distal ends directly coupled to the second beveled gear and one of the light-emitting sources respectively.

9 Claims, 9 Drawing Sheets

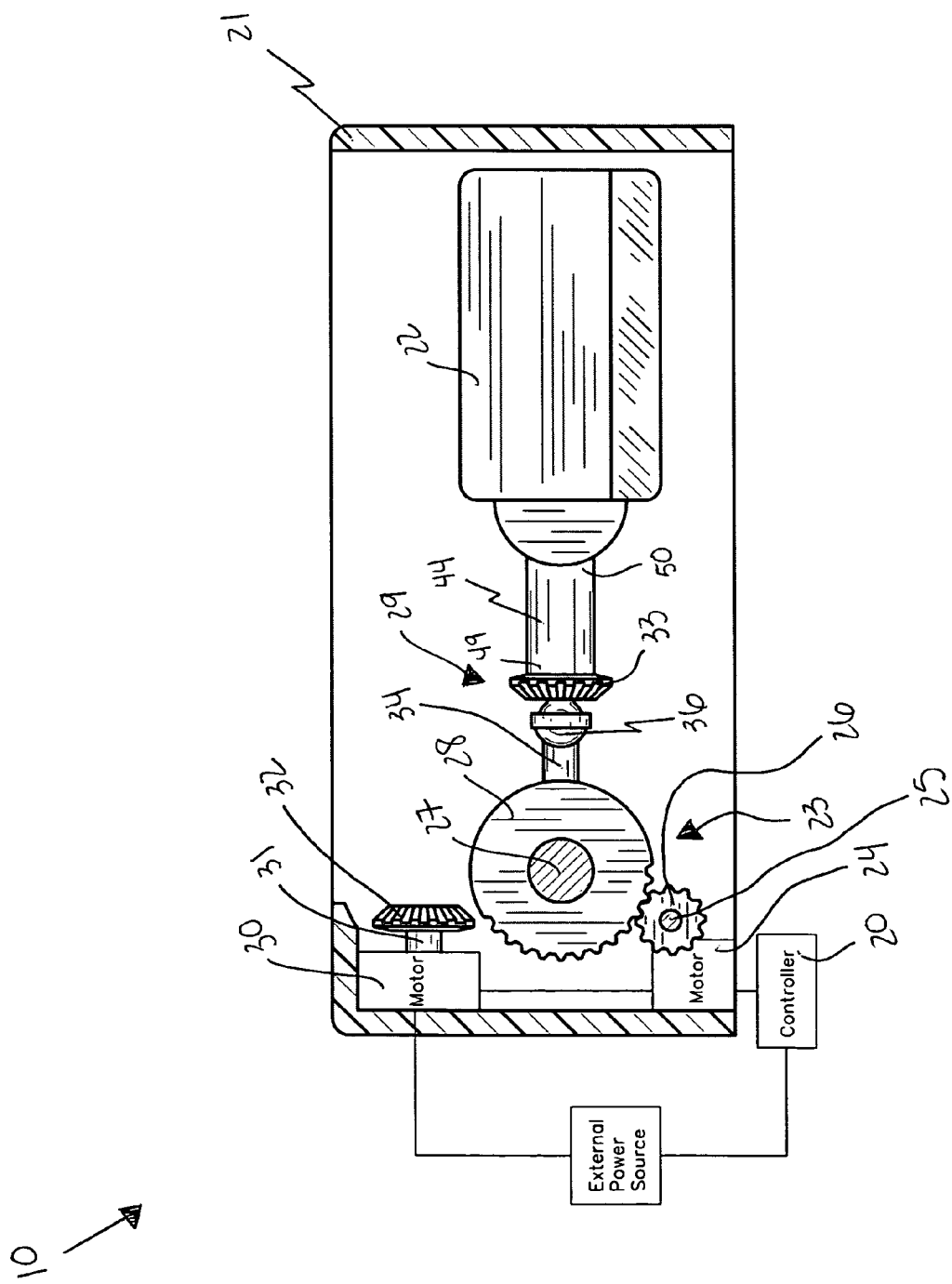

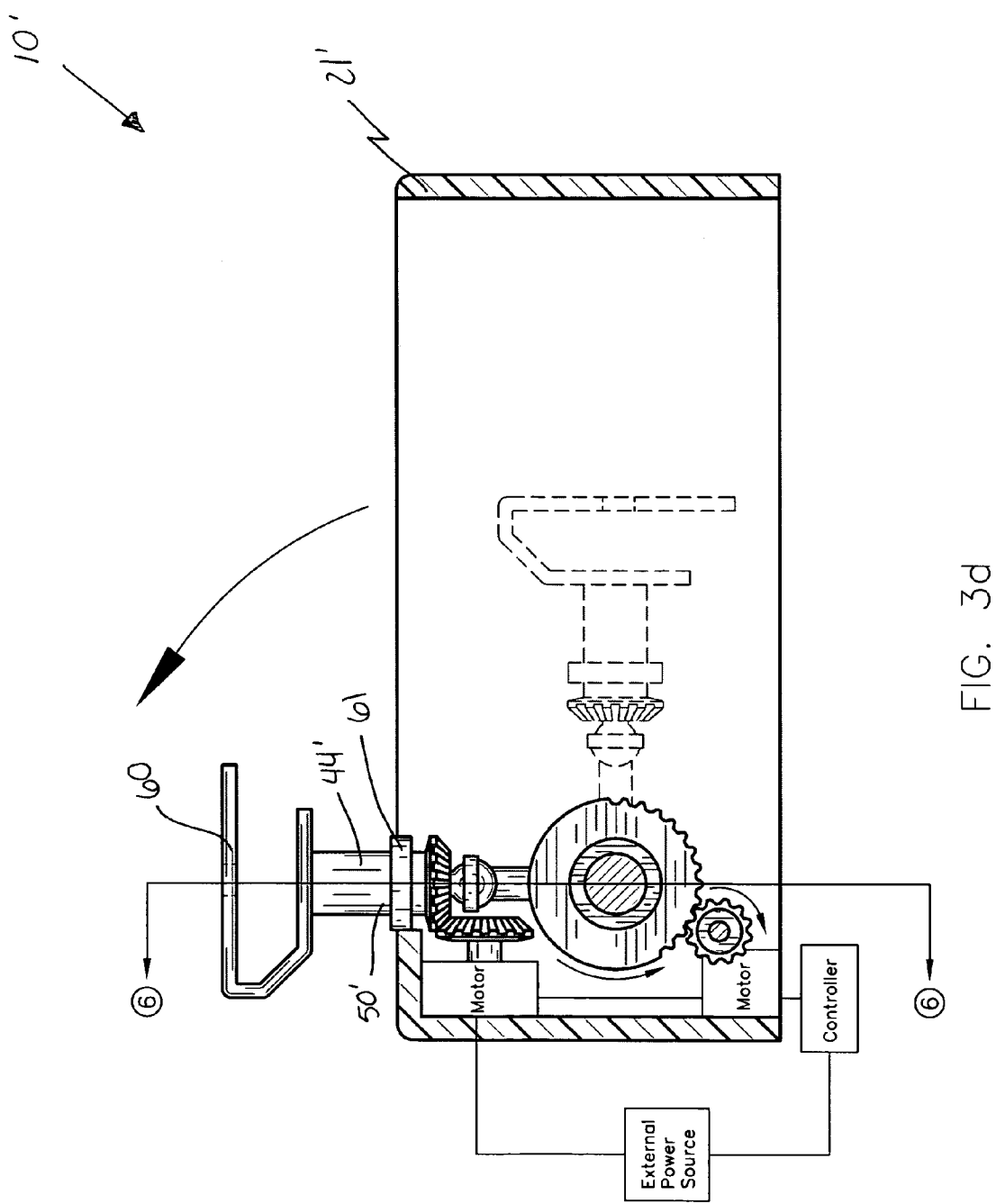

RETRACTABLE ROTATIONALLY ADJUSTABLE LIGHTING ASSEMBLY AND METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to lighting assemblies and, more particularly, to a multi-functional auxiliary vehicle lighting assembly for illuminating at least one target zone located external to an existing vehicle.

2. Prior Art

Off-road enthusiasts often wish to have more powerful illuminating means than what is provided by the conventional light emitting assemblies on their vehicle. This is due to the fact that there is usually limited to no light in the areas where off road endeavors are undertaken. As such, many off road enthusiasts opt to attach an auxiliary light bar to the roof of their vehicle for providing a plurality of high intensity light beams during severely low light conditions. The major disadvantage of such light bars is the fact that they remain positioned and attached to the exterior of the roof at times when they are not needed. The wind drag created by such light bar assemblies during normal city and highway driving conditions can greatly affect a vehicle's gas mileage. The current light bar designs leaves the light exposed to environmental abuse. They also extend the over-all height of vehicles, a concern when driving into garages (private and commercial)

U.S. Pat. No. 6,733,163 to Wang discloses a vehicle auxiliary light assembly having a housing that houses a conventional, central incandescent light bulb and an electro-luminescent panel (ELP) that is located around the inner perimeter of the housing. The ELP, depending on the luminescent material used, can be made to illuminate in various colors. The assembly can be operated by either a first cable assembly or a second cable assembly. The first cable assembly allows the incandescent light bulb and the ELP to be operated independently of each other. The second cable assembly allows the light and the ELP to be operated simultaneously. Unfortunately, this prior art example is not designed for all vehicles that need extra lighting and/or specialty lighting applications.

U.S. Pat. No. 5,997,159 to Huang discloses a vehicle light assembly comprised of a housing, a locking ring mechanism, a socket holding plate, a lens, and an attachment cover. The housing has at least three spaced apart bosses which extend inwardly and located adjacent to a front rim. The retaining ring adapter has an inner ring and an outer ring which is slightly larger than the inner ring. The inner ring has at least three spaced apart locking slots which are aligned with and rotatably engaged with the three bosses of the housing. The outer ring abuts against the front rim outside of the housing, where screws are provided to pull the inner ring against the outer rim so that the locking slots are further engaged with the bosses to further secure the inner ring thereto. The socket holding plate is installed on top of the outer ring of the retaining ring adapter for retaining a socket wherein a light bulb is installed thereto. The lens is placed over the light bulb and secured to the socket holding plate by the attachment cover. Unfortunately, this prior art example does not provide a means for retracting the lights, thereby providing protection for the lights when they are not in use.

Accordingly, the present invention is disclosed in order to overcome the above noted shortcomings. The assembly is convenient and easy to use, lightweight yet durable in design, and designed for illuminating at least one target zone located external to an existing vehicle. The multi-functional vehicle lighting assembly is simple to use, relatively inexpensive, and designed for many years of repeated use.

BRIEF SUMMARY OF THE INVENTION

In view of the foregoing background, it is therefore an object of the present invention to provide an apparatus for illuminating at least one target zone located external to an existing vehicle. These and other objects, features, and advantages of the invention are provided by a multi-functional vehicle lighting assembly.

A multi-functional vehicle lighting assembly effectively includes a controller, a housing coupled to an exterior surface of the existing vehicle, and a plurality of light-emitting sources attached to the housing.

In a first embodiment, the assembly may further include a mechanism for selectively pivoting the light-emitting sources between vertical and horizontal positions that are conveniently defined at opposed ends of a first arcuate path. Such a horizontal position is further defined inside of the housing. The pivoting mechanism includes a motor electrically coupled to the controller, a drive shaft connected to the motor and rotatable along a first rotational path, a drive gear concentrically mated about the drive shaft and rotatable in sync therewith, a driven shaft rotatable along a second rotational path, and a driven gear concentrically mated about the driven shaft and rotatable in sync therewith. Such a drive gear is directly engaged with the driven gear and arranged in such a manner therewith that the driven shaft is caused to rotate about the second rotational path when the drive gear is rotated about the first rotational path such that the light-emitting sources are pivoted along the first arcuate path and thereby articulated to opposed positions defined interior and exterior of the housing respectively.

In another embodiment or in combination with the first embodiment, the assembly may optionally include a mechanism for selectively swiveling the light-emitting sources along clockwise and counter clockwise directions when the light-emitting sources are advantageously adapted to the vertical position. Such clockwise and counter clockwise directions travel along second arcuate paths defined about vertical fulcrum axes associated with each of the light-emitting sources. The swiveling mechanism includes a motor electrically coupled to the controller, a drive shaft attached to the motor, a first beveled gear directly attached to an end of the drive shaft, a second beveled gear directly engaged with the first beveled gear, a first stabilizing rod connected to the driven gear of the pivoting mechanism and extending upwardly therefrom, and a ball and socket joint engaged with a distal end of the first stabilizing rod. One skilled in the art understands that other suitable rotating mechanisms may be employed in lieu of the ball and socket joint mentioned hereinabove.

Such a ball and socket coupling includes a ball bearing including a protrusion continuously extending about an outer perimeter thereof, and a socket disposed at a distal end of the first stabilizing rod. Such a socket is provided with a continuous groove formed along an inner perimeter thereof and configured in such a manner that the protrusion is rotatably interfitted therein to thereby allow a support beam (described hereinbelow) to synchronously rotate along the clockwise and counter clockwise directions while the first stabilizing rod remains statically engaged with the driven gear of the pivoting mechanism.

The swiveling mechanism further includes a support beam with axially opposed proximal and distal ends directly coupled to the second beveled gear and one of the light-emitting sources respectively. The motor synchronously rotates the drive shaft and the first beveled gear along a third rotational path and thereby causes the second beveled gear to conveniently rotate along a fourth rotational path defined orthogonal to the first rotational path such that the support beam swivels along a corresponding one of the clockwise and counter clockwise directions. Also, the controller independently toggles the pivoting mechanism and the swiveling mechanism between operating and non-operating modes based upon a user input.

A method for illuminating at least one target zone located external to an existing vehicle includes the steps of: providing a controller; providing and coupling a housing on an exterior surface of the existing vehicle; providing and attaching a plurality of light-emitting sources to the housing; selectively pivoting the light-emitting sources between vertical and horizontal positions that are defined at opposed ends of a first arcuate path; and after adapting the light-emitting sources to the vertical position, selectively swiveling the light-emitting sources along clockwise and counter clockwise directions by swiveling the light-emitting sources along second arcuate paths defined about vertical fulcrum axes associated with each of the light-emitting sources.

The method further includes the steps of: providing and electrically coupling a motor to the controller; providing and connecting a drive shaft to the motor in such a manner that the drive shaft is rotatable along a first rotational path; providing and concentrically mating a drive gear about the drive shaft in such a manner that the drive gear is rotatable in sync therewith; providing a driven shaft that is rotatable along a second rotational path; providing and concentrically mating a driven gear about the driven shaft such that the driven gear is rotatable in sync therewith; the drive gear directly engaging the driven gear; rotating the driven shaft about the second rotational path by rotating the drive gear about the first rotational path; and pivoting the light-emitting sources along the first arcuate path by articulating the light-emitting sources to opposed positions defined interior and exterior of the housing respectively.

The method further includes the steps of: providing and electrically coupling a motor to the controller; providing and attaching a drive shaft to the motor; providing and directly attaching a first beveled gear to an end of the drive shaft; providing and directly engaging a second beveled gear with the first beveled gear; providing and connecting a first stabilizing rod to the driven gear of the pivoting mechanism by extending the first stabilizing rod upwardly therefrom; providing and engaging a ball and socket joint with a distal end of the first stabilizing rod; providing a support beam; directly coupling axially opposed proximal and distal ends of the support beam to the second beveled gear and one of the light-emitting sources respectively; synchronously rotating the motor with the drive shaft and the first beveled gear along a third rotational path; rotating the second beveled gear along a fourth rotational path defined orthogonal to the first rotational path; and swiveling the support beam along a corresponding one of the clockwise and counter clockwise directions.

The method further includes the step of providing a ball bearing including a protrusion continuously extending about an outer perimeter thereof; providing and disposing a socket at a distal end of the first stabilizing rod, the socket is provided with a continuous groove formed along an inner perimeter thereof; rotatably interfitting the protrusion within the groove; and synchronously rotating the support beam along the clockwise and counter clockwise directions while the first stabilizing rod remains statically engaged with the driven gear of the pivoting mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3a is a cross sectional view, taken along line 3-3 as seen in FIG. 1, showing the pivoting mechanism and selectively swiveling mechanism, in accordance with the present invention;

FIG. 3d is a cross sectional view, taken along line 3-3 as seen in FIG. 1, showing an alternate embodiment of the multifunctional vehicle lighting assembly, in accordance with the present invention;

DETAILED DESCRIPTION OF THE INVENTION

Figure 1:
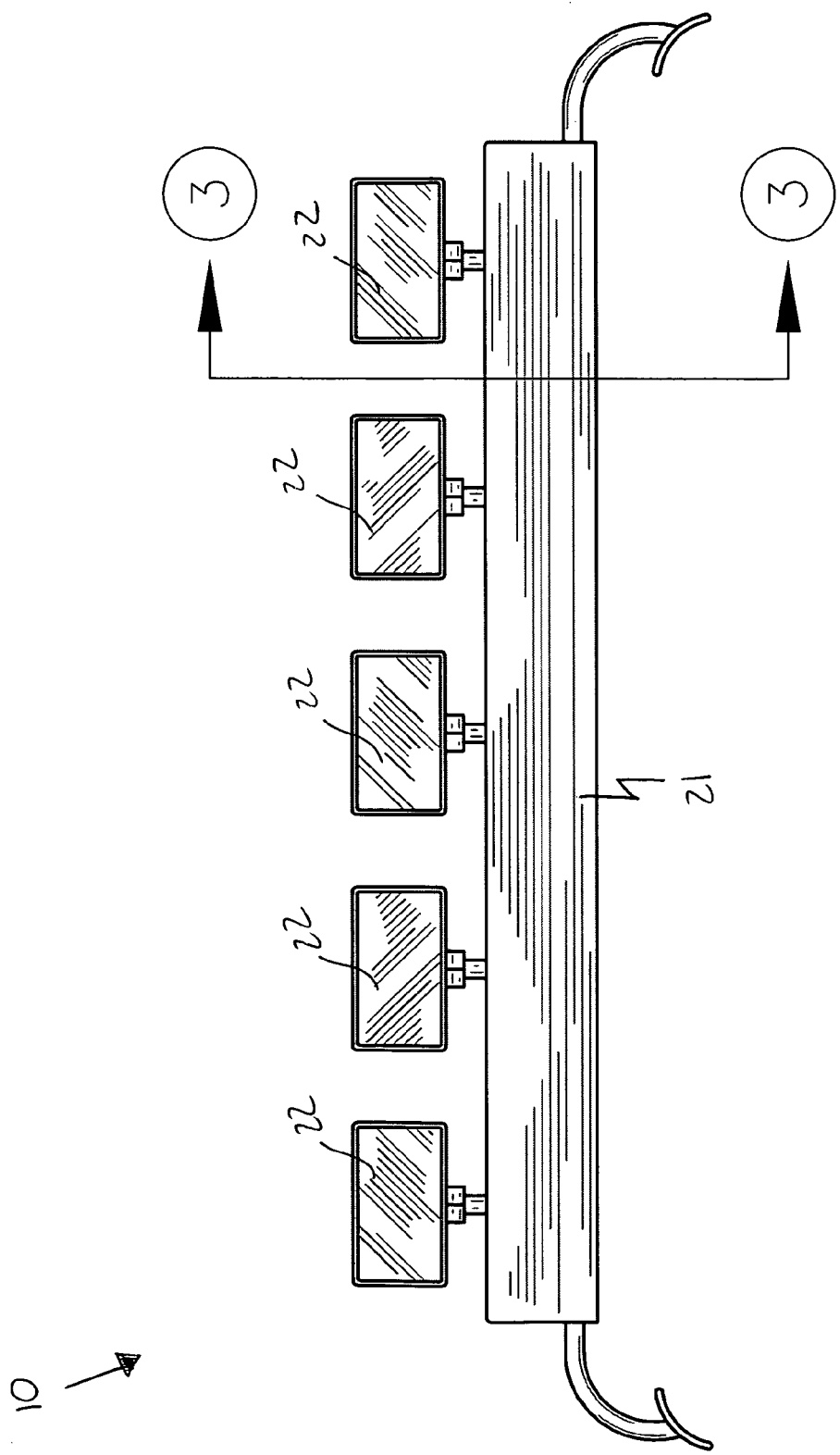
FIG. 1 is a front elevational view of a multi-functional vehicle lighting assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to protect a multi-functional vehicle lighting assembly. It should be understood that the apparatus 10 may be used on many different types of vehicles and should not be limited to use with only those types of vehicles mentioned herein.

Figure 2:
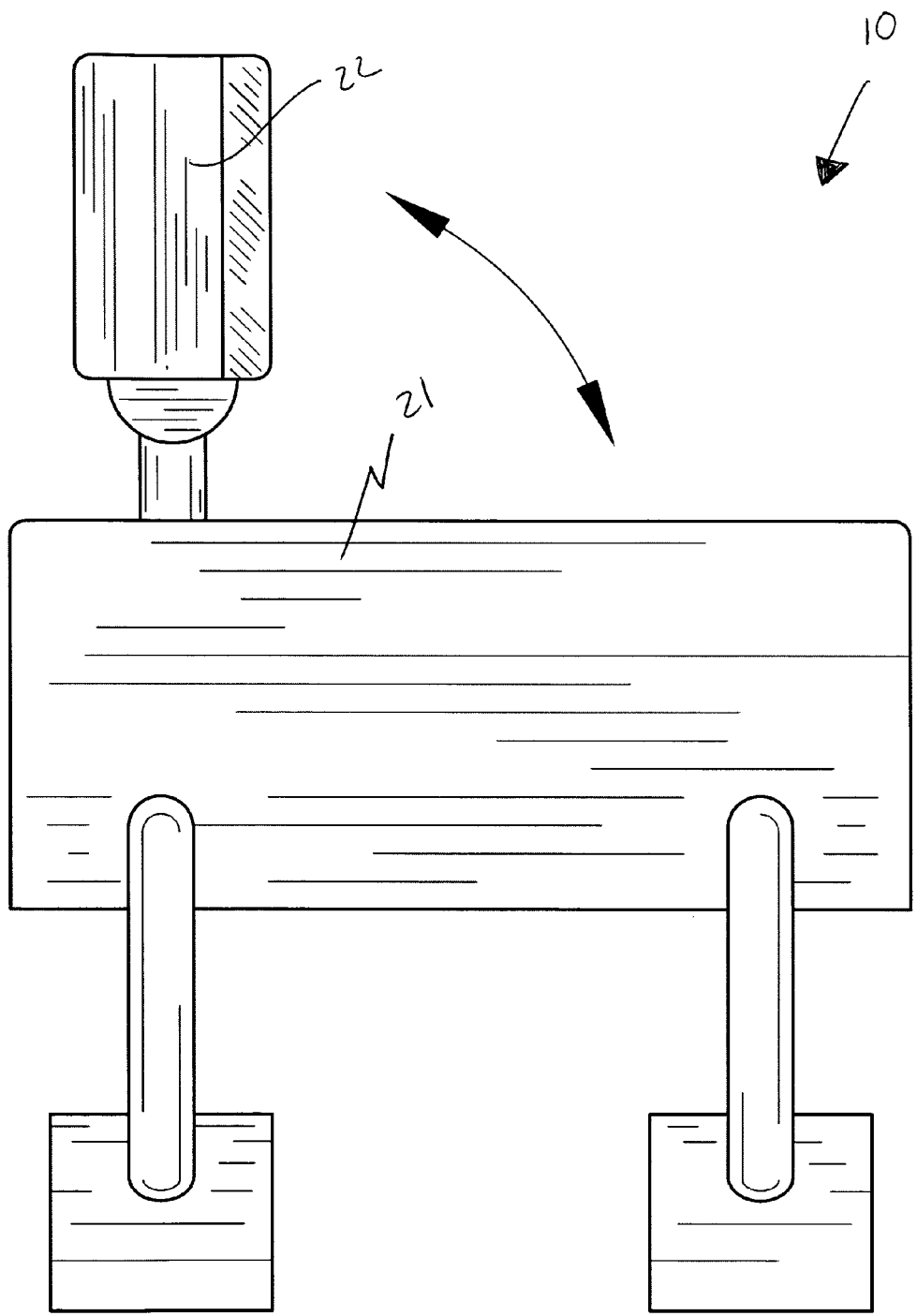
FIG. 2 is a side elevational view of a multi-functional vehicle lighting assembly, in accordance with the present invention.
Figure 4:
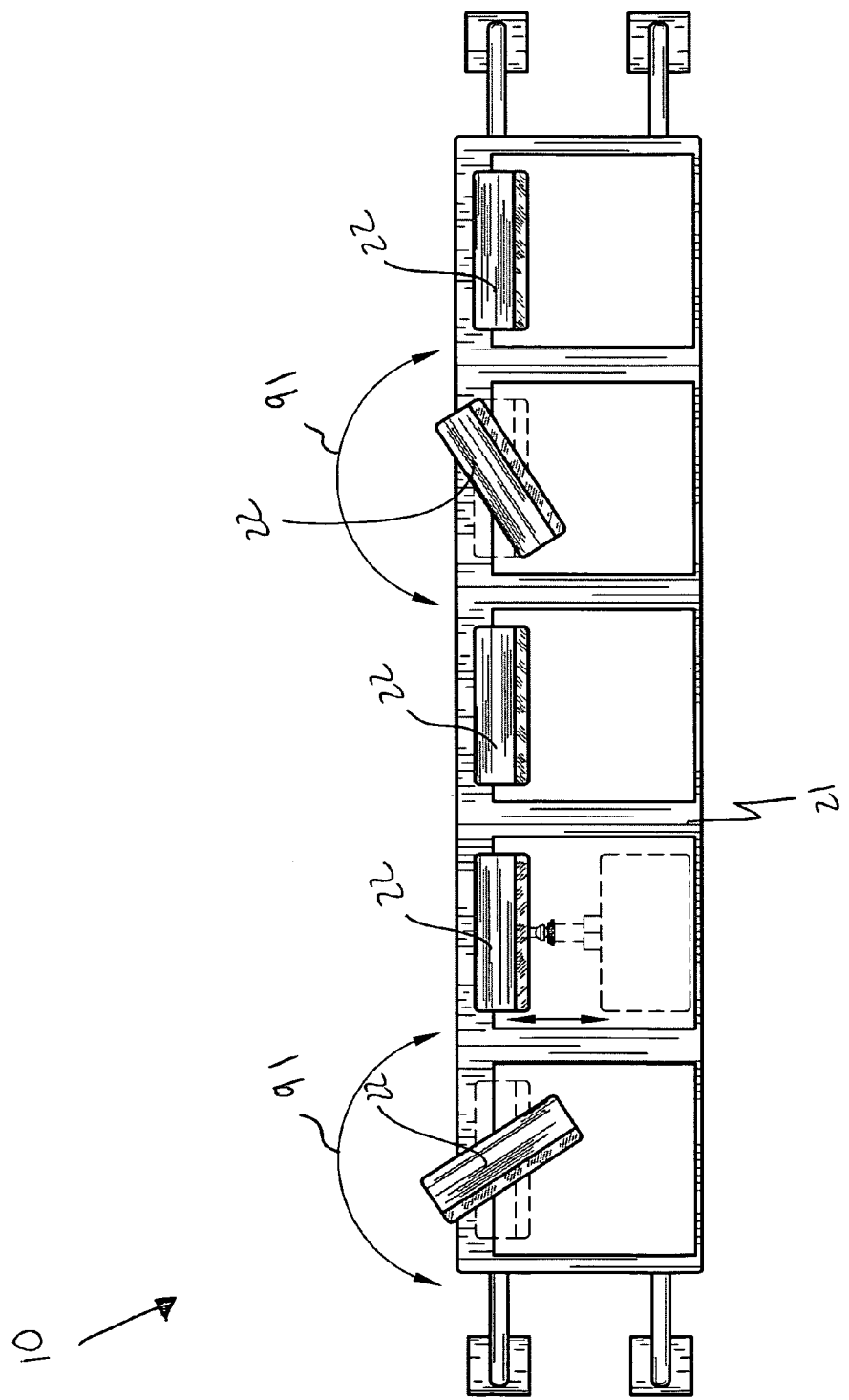
FIG. 4 is a top planar view of a multi-functional vehicle lighting assembly, in accordance with the present invention.
Figure 5:
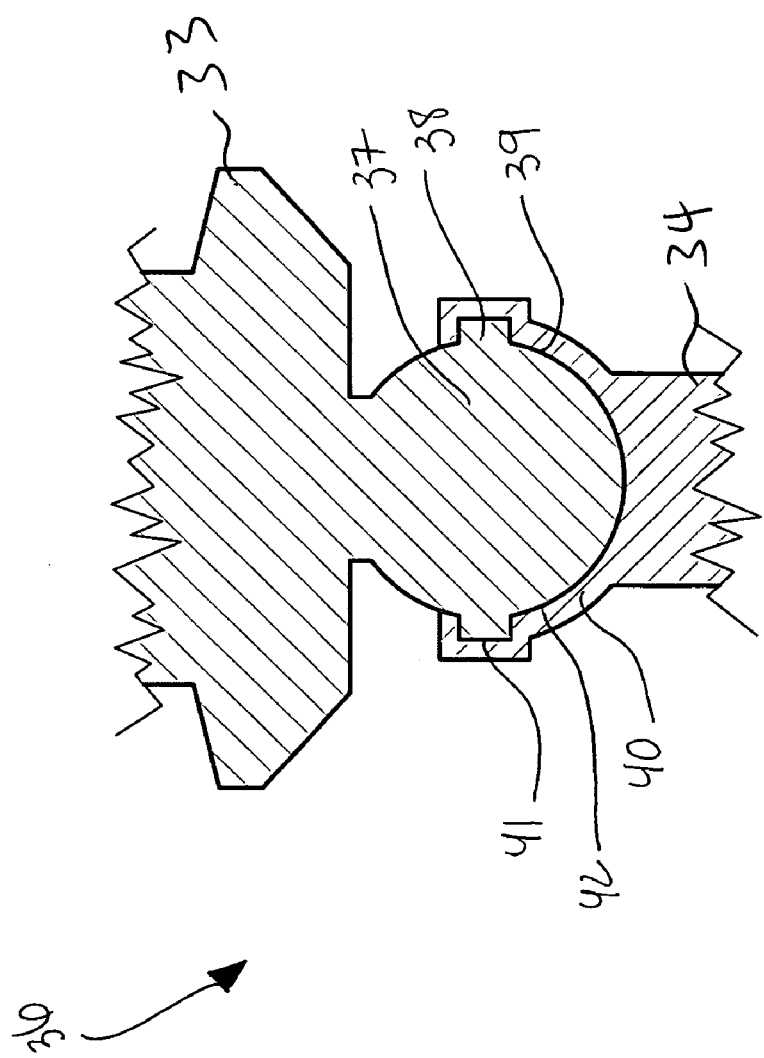
FIG. 5 is a cross sectional view of the ball and socket coupling, in accordance with the present invention.

Referring initially to FIGS. 1, 2 and 4, a multi-functional vehicle lighting assembly 10 includes a controller 20, a housing 21 coupled to an exterior surface of the existing vehicle, and a plurality of light-emitting sources 22 attached to the housing 21.

Figure 3B:
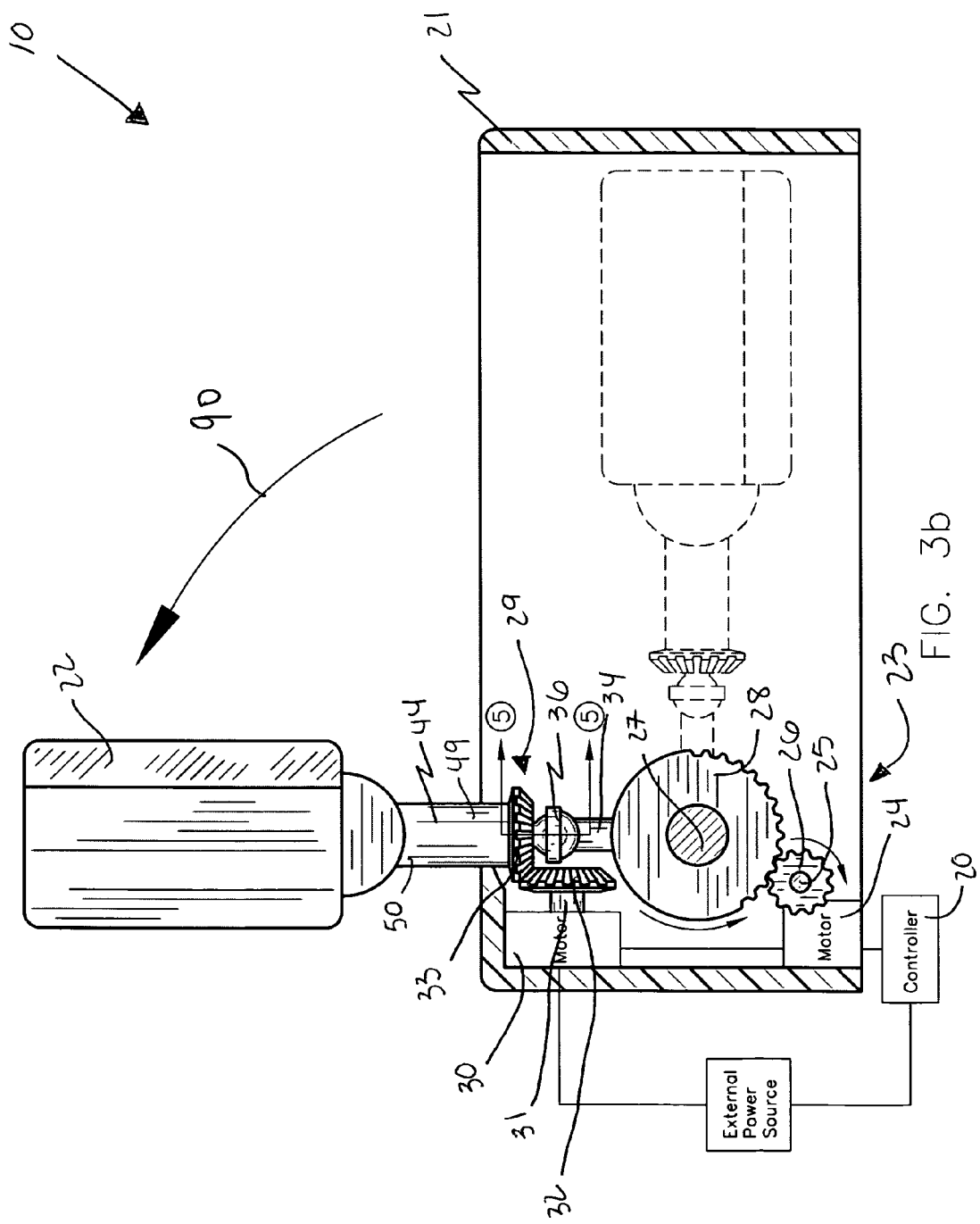
FIG. 3b is a cross sectional view, taken along line 3-3 as seen in FIG. 1, showing the upward swiveling motion of a light-emitting source, in accordance with the present invention.
Figure 3C:
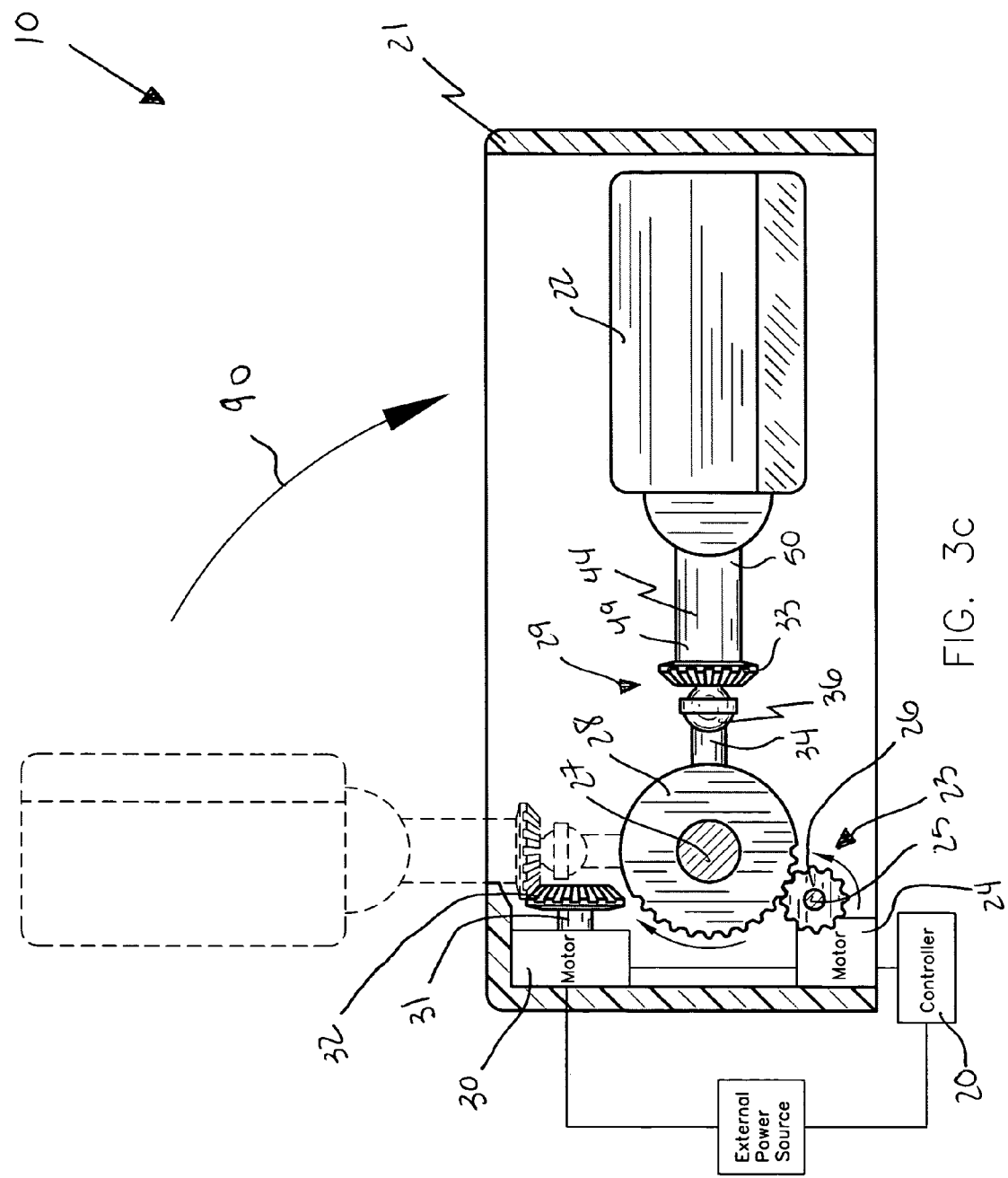
FIG. 3c is a cross sectional view, taken along line 3-3 as seen in FIG. 1, showing the downward swiveling motion of a light-emitting source, in accordance with the present invention.

Referring to FIGS. 3a, 3b and 3c, the assembly 10 may further include a mechanism 23 for selectively pivoting the light-emitting sources 22 between vertical and horizontal positions that are defined at opposed ends of a first arcuate path. Such a horizontal position is defined inside of the housing. The pivoting mechanism 23 includes a motor 24 electrically coupled to the controller 20; a drive shaft 25 connected to the motor 24 and rotatable along a first rotational path; a drive gear 26 concentrically mated about the drive shaft 25 and rotatable in sync therewith; a driven shaft 27 rotatable along a second rotational path; and a driven gear 28 concentrically mated about the driven shaft 27 and rotatable in sync therewith. The drive gear 26 is directly engaged, without the use of intervening elements, with the driven gear 28 and arranged in such a manner therewith that the driven shaft 27 is caused to rotate about the second rotational path when the drive gear 26 is rotated about the first rotational path which is important such that the light-emitting sources 22 are pivoted along the first arcuate path 90 and thereby articulated to opposed positions defined interior and exterior of the housing 21 respectively. The pivoting mechanism 23 enables a user to either expose the light-emitting sources 22 to the outside environment or to position them within the housing 21 when they are not in use.

Referring to FIGS. 3a, 3b, 3c, 4 and 5, the assembly 10 may further include an optional mechanism 29 for selectively swiveling the light-emitting sources 22 along clockwise and counter clockwise directions when the light-emitting sources 22 are adapted to the vertical position. The components of mechanism 29 should remain directly engaged to prevent mud, sticks, snow, ice, etc. from damaging such components. Such clockwise and counter clockwise directions travel along second arcuate paths 91 defined about vertical fulcrum axes associated with each of the light-emitting sources 22. The swiveling mechanism 29 includes a motor 30 electrically coupled to the controller 20; a drive shaft 31 attached to the motor 30; a first beveled gear 32 directly attached, without the use of intervening elements, to an end of the drive shaft 31; a second beveled gear 33 directly engaged, without the use of intervening elements, with the first beveled gear 32; a first stabilizing rod 34 connected to the driven gear 28 of the pivoting mechanism 23 and extending upwardly therefrom; and a ball and socket joint 36 engaged with a distal end of the first stabilizing rod 34. One skilled in the art understands that other suitable rotating mechanisms may be employed in lieu of the ball and socket joint 36 mentioned hereinabove.

Such a ball and socket coupling 36 includes a ball bearing 37 including a protrusion 38 continuously extending about an outer perimeter 39 thereof, and a socket 40 disposed at a distal end of the first stabilizing rod. Such a socket 40 is provided with a continuous groove 41 formed along an inner perimeter 42 thereof and configured in such a manner that the protrusion 38 is rotatably interfitted therein to thereby allow a support beam 44 to synchronously rotate along the clockwise and counter clockwise directions while the first stabilizing rod 34 remains statically engaged with the driven gear 28 of the pivoting mechanism 23. The pivoting mechanism 23 and/or selectively swiveling mechanism may be optional in order to accommodate varying laws of states throughout the country. Some states prohibit citizens from attaching swivel spotlights to their vehicles, therefore a stationary version of the stabilizing rod 34 may be provided for providing compliance with state laws.

Referring to FIGS. 3a, 3b and 3c, the swiveling mechanism 29 further includes the support beam 44 (as noted hereinabove) which has axially opposed proximal and distal ends 49, 50 directly coupled, without the use of intervening elements, to the second beveled gear 33 and one of the light-emitting sources 22 respectively. Each of the beveled gears are preferably greased with appropriate lubricating ointments and gels to ensure a smooth and continuous rotational engagement during inclement operating conditions. The motor 30 synchronously rotates the drive shaft 31 and the first beveled gear 32 along a third rotational path and thereby causes the second beveled gear 33 to rotate along a fourth rotational path defined orthogonal to the first rotational path which is crucial such that the support beam 44 swivels along a corresponding one of the clockwise and counter clockwise directions, while the light-emitting source 22 is disposed at the vertical position. Also, the controller 20 independently toggles the pivoting mechanism 23 and the swiveling mechanism 29 between operating and non-operating modes based upon a user input so that swiveling and pivoting motions can be independently achieved for each light-emitting source 22 (as best shown in FIG. 4).

Figure 6:
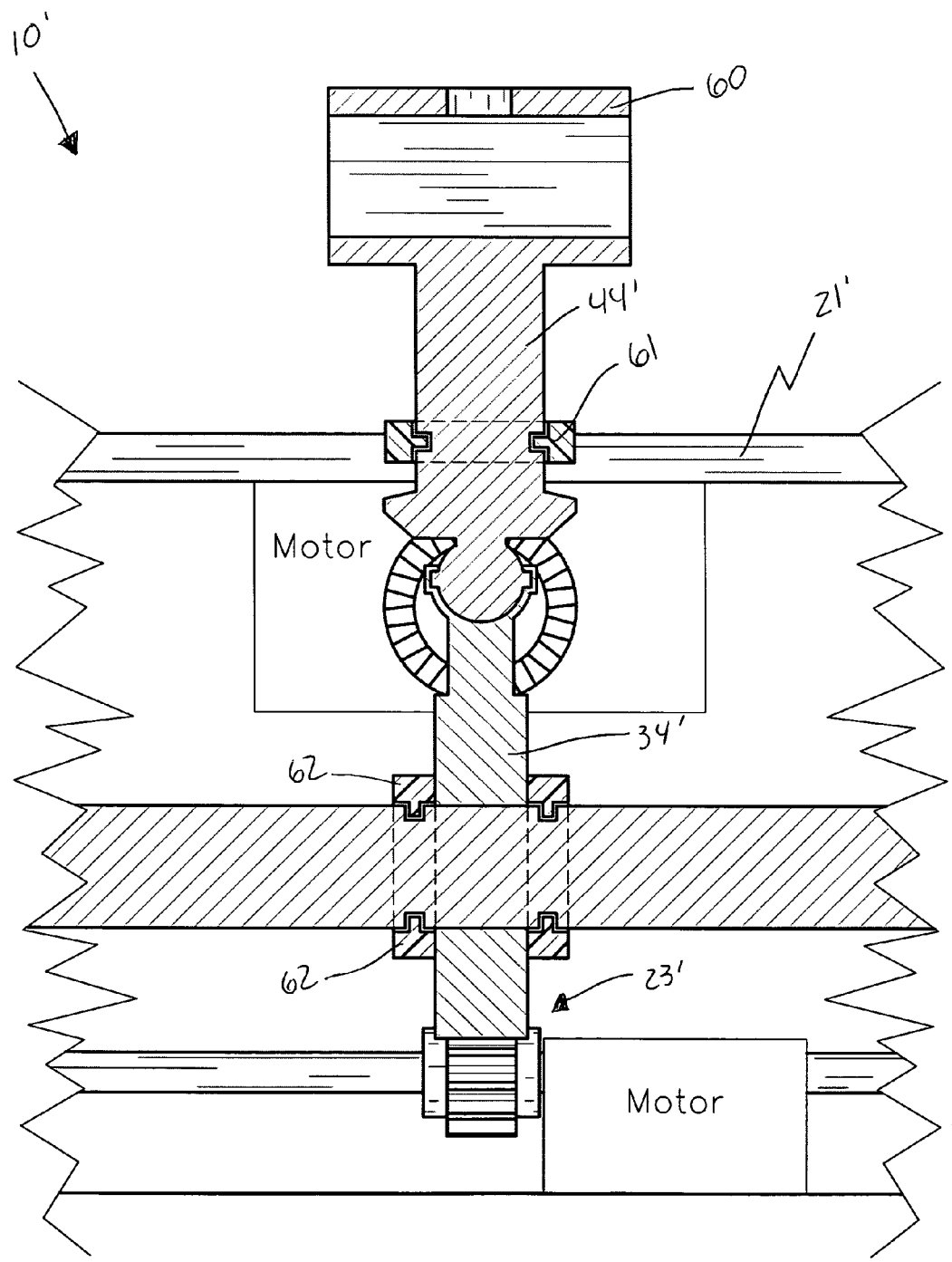
FIG. 6 is a cross sectional view of the alternate embodiment of the multifunctional vehicle lighting assembly, taken along line 6-6, as seen in FIG. 3d.

Referring to FIGS. 3d and 6, an alternate embodiment of the multifunctional vehicle lighting system 10' includes a bracket 60 statically coupled to the support beam 44'. Such a bracket 60 is provided for temporarily holding a variety of styles of light-emitting sources, as may be desired by a particular user. The alternate embodiment may further include a or collar 61, incorporated into a distal end 50' of the support beam 44', for preventing water, dirt or other debris from entering the housing 21'. The collar 61 may be formed from a rubber gasket or O-ring washer, for example. Further, a plurality of similar collars 62 may be positioned around the stabilizing rod 34' for further preventing water, dirt and debris from inhibiting the pivoting mechanism 23'.

The alternate embodiment 10' is designed for providing a protective enclosure/housing for almost any aftermarket accessory light unit on a light-bar. The bracket 60 is therefore designed for enabling a user to affix their choice of lights to the assembly. The bracket 60 will be universal in design to thereby allow mounting of most commonly used light units. Further, the housing 21 will provide weather-resistant protection for the light units.

The system 10 includes a plurality of lights that extend upward when being used and are retracted downward when not being used. In an alternate embodiment the lights may motor up when being used and motor down when not being used. The system may also include a sturdy, rectangular-shaped housing that encloses a plurality of motors that extend and retract the lights. A motor may be positioned below each light (or set of lights) and a drive shaft extending from each motor may be mechanically and directly coupled, without the use of intervening elements, to the lights by gearing (as described hereinabove). A controller which would effectively control operation of the motors and the lights could be installed in the passenger compartment of a vehicle, at a location that would be readily accessible to the driver. Such a controller would be electrically connected to the motors and the light assemblies by insulated wiring that would be routed through the engine compartment.

The present invention, as claimed, provides the unexpected and unpredictable benefit of a system that is convenient and easy to use, is durable in design, is versatile in its applications, and provides an innovative and practical idea for not only off road vehicles, but all vehicles that need extra lighting and/or specialty lighting applications. The present invention keeps the lights safely protected when retracted, and provides a clean low profile advantage when not in use. No longer will light bar lights need to be covered and uncovered by hand with caps, nor will lights need to be repositioned after having been knocked out of alignment due to low hanging obstacles. With the present system, the lights are conveniently and fully operated from inside the vehicle, which is especially convenient during inclement weather.

In use, a method for illuminating at least one target zone located external to an existing vehicle includes the steps of: providing a controller 20; providing and coupling a housing 21 on an exterior surface of the existing vehicle; providing and attaching a plurality of light-emitting sources 22 to the housing 21; selectively pivoting the light-emitting sources 22 between vertical and horizontal positions that are defined at opposed ends of a first arcuate path; and after adapting the light-emitting sources 22 to the vertical position, in the optional embodiment, selectively swiveling the light-emitting sources 22 along clockwise and counter clockwise directions by swiveling the light-emitting sources 22 along second arcuate paths defined about vertical fulcrum axes associated with each of the light-emitting sources 22.

In use, the method further includes the steps of: providing and electrically coupling a motor 24 to the controller 20; providing and connecting a drive shaft 25 to the motor 24 in such a manner that the drive shaft 25 is rotatable along a first rotational path; providing and concentrically mating a drive gear 26 about the drive shaft 25 in such a manner that the drive gear 26 is rotatable in sync therewith; providing a driven shaft 27 that is rotatable along a second rotational path; providing and concentrically mating a driven gear 28 about the driven shaft 27 such that the driven gear 28 is rotatable in sync therewith; the drive gear 26 directly engaging, without the use of intervening elements, the driven gear 28; rotating the driven shaft 27 about the second rotational path by rotating the drive gear 26 about the first rotational path; and pivoting the light-emitting sources 22 along the first arcuate path by articulating the light-emitting sources 22 to opposed positions defined interior and exterior of the housing 21 respectively.

In use, the method further includes the steps of: providing and electrically coupling a motor 30 to the controller 20; providing and attaching a drive shaft 31 to the motor 30; providing and directly attaching, without the use of intervening elements, a first beveled gear 32 to an end of the drive shaft 31; providing and directly engaging, without the use of intervening elements, a second beveled gear 33 with the first beveled gear 32; providing and connecting a first stabilizing rod 34 to the driven gear 28 of the pivoting mechanism 23 by extending the first stabilizing rod upwardly therefrom; providing and engaging a ball and socket joint with a distal end of the first stabilizing rod; statically affixing a distal end of the first stabilizing rod to the second beveled gear; providing a support beam 44; directly coupling, without the use of intervening elements, axially opposed proximal and distal ends 49, 50 of the support beam 44 to the second beveled gear 33 and one of the light-emitting sources 22 respectively; synchronously rotating the motor 30 with the drive shaft 31 and the first beveled gear 32 along a third rotational path; rotating the second beveled gear 33 along a fourth rotational path defined orthogonal to the first rotational path; and swiveling the support beam 44 along a corresponding one of the clockwise and counter clockwise directions.

In use, the method further includes the step of providing a ball bearing 37 including a protrusion 38 continuously extending about an outer perimeter 39 thereof; providing and disposing a socket at a distal end of the first stabilizing rod, the socket 40 is provided with a continuous groove 41 formed along an inner perimeter 42 thereof; rotatably interfitting the protrusion 38 within the groove 41; and synchronously rotating the support beam 44 along the clockwise and counter clockwise directions while the first stabilizing rod remains statically engaged with the driven gear of the pivoting mechanism.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multi-functional vehicle lighting assembly for illuminating at least one target zone located external to an existing vehicle, said multi-functional vehicle lighting assembly comprising:
   a controller;
   a housing coupled to the existing vehicle;
   a plurality of light-emitting sources attached to said housing;
   means for selectively pivoting said light-emitting sources between vertical and horizontal positions that are defined at opposed ends of a first arcuate path; and
   means for selectively swiveling said light-emitting sources along clockwise and counter clockwise directions when said light-emitting sources are adapted to the vertical position, said clockwise and counter clockwise directions traveling along second arcuate paths;

wherein said controller independently toggles said pivoting means and said swiveling means between operating and non-operating modes based upon a user input;

wherein said pivoting means comprises a motor electrically coupled to said controller;

a drive shaft connected to said motor and being rotatable along a first rotational path;

a drive gear concentrically mated about said drive shaft and being rotatable in sync therewith;

a driven shaft being rotatable along a second rotational path; and a driven gear concentrically mated about said driven shaft and being rotatable in sync therewith;

wherein said drive gear is directly engaged with said driven gear and arranged in such a manner therewith that said driven shaft is caused to rotate about said second rotational path when said drive gear is rotated about the first rotational path such that said light-emitting sources are pivoted along said first arcuate path and thereby articulated to opposed positions defined interior and exterior of said housing respectively.

2. The multi-functional vehicle lighting assembly of claim 1, wherein said swiveling means comprises:

a motor electrically coupled to said controller;

a drive shaft attached to said motor;

a first beveled gear directly attached to an end of said drive shaft;

a second beveled gear directly engaged with said first beveled gear;

a first stabilizing rod connected to said driven gear of said pivoting means and extending upwardly therefrom;

a ball and socket joint engaged with a distal end of said first stabilizing rod; and a support beam having axially opposed proximal and distal ends directly coupled to said second beveled gear and one of said light-emitting sources respectively;

wherein said motor synchronously rotates said drive shaft and said first beveled gear along a third rotational path and thereby causes said second beveled gear to rotate along a fourth rotational path defined orthogonal to said first rotational path such that said support beam swivels along a corresponding one of said clockwise and counter clockwise directions.

3. The multi-functional vehicle lighting assembly of claim 2, wherein said ball and socket coupling comprises:

a ball bearing including a protrusion continuously extending about an outer perimeter thereof; and a socket disposed at a distal end of said first stabilizing rod, said socket being provided with a continuous groove formed along an inner perimeter thereof and configured in such a manner that said protrusion is rotatably interfitted therein to thereby allow said support beam to synchronously rotate along the clockwise and counter clockwise directions.

4. A multi-functional vehicle lighting assembly for illuminating at least one target zone located external to an existing vehicle, said multi-functional vehicle lighting assembly comprising:

a controller;

a housing coupled to an exterior surface of the existing vehicle;

a plurality of light-emitting sources attached to said housing;

means for selectively pivoting said light-emitting sources between vertical and horizontal positions that are defined at opposed ends of a first arcuate path, said horizontal position being further defined inside of said housing; and means for selectively swiveling said light-emitting sources along clockwise and counter clockwise directions when said light-emitting sources are adapted to the vertical position, said clockwise and counter clockwise directions traveling along second arcuate paths defined about vertical fulcrum axes associated with each of said light-emitting sources;

wherein said controller independently toggles said pivoting means and said swiveling means between operating and non-operating modes based upon a user input;

wherein said pivoting means comprises a motor electrically coupled to said controller;

a drive shaft connected to said motor and being rotatable along a first rotational path;

a drive gear concentrically mated about said drive shaft and being rotatable in sync therewith;

a driven shaft; and a driven gear concentrically mated about said driven shaft and being rotatable in sync therewith;

wherein said drive gear is directly engaged with said driven gear and arranged in such a manner therewith that said driven shaft is caused to rotate about said second rotational path when said drive gear is rotated about the first rotational path such that said light-emitting sources are pivoted along said first arcuate path and thereby articulated to opposed positions defined interior and exterior of said housing respectively.

5. The multi-functional vehicle lighting assembly of claim 4, wherein said swiveling means comprises:

a motor electrically coupled to said controller;

a drive shaft attached to said motor;

a first beveled gear directly attached to an end of said drive shaft;

a second beveled gear directly engaged with said first beveled gear;

a first stabilizing rod connected to said driven gear of said pivoting means and extending upwardly therefrom;

a ball and socket joint engaged with a distal end of said first stabilizing rod; and a support beam having axially opposed proximal and distal ends directly coupled to said second beveled gear and one of said light-emitting sources respectively;

wherein said motor synchronously rotates said drive shaft and said first beveled gear along a third rotational path and thereby causes said second beveled gear to rotate along a fourth rotational path defined orthogonal to said first rotational path such that said support beam swivels along a corresponding one of said clockwise and counter clockwise directions.

6. The multi-functional vehicle lighting assembly of claim 5, wherein said ball and socket coupling comprises:

a ball bearing including a protrusion continuously extending about an outer perimeter thereof; and a socket disposed at a distal end of said first stabilizing rod, said socket being provided with a continuous groove formed along an inner perimeter thereof and configured in such a manner that said protrusion is rotatably interfitted therein to thereby allow said support beam to synchronously rotate along the clockwise and counter clockwise directions while said first stabilizing rod remains statically engaged with said driven gear of said pivoting means.

7. A method for illuminating at least one target zone located external to an existing vehicle, said method comprising the steps of:
   a. providing a controller;
   b. providing and coupling a housing an exterior surface of the existing vehicle;
   c. providing and attaching a plurality of light-emitting sources to said housing;
   d. selectively pivoting said light-emitting sources between vertical and horizontal positions that are defined at opposed ends of a first arcuate path; and
   e. after adapting said light-emitting sources to the vertical position, selectively swiveling said light-emitting sources along clockwise and counter clockwise directions by swiveling said light-emitting sources along second arcuate paths defined about vertical fulcrum axes associated with each of said light-emitting sources;
   wherein step d comprises the steps of:
   providing and electrically coupling a motor to said controller;
   providing and connecting a drive shaft to said motor in such a manner that said drive shaft is rotatable along a first rotational path;
   providing and concentrically mating a drive gear about said drive shaft in such a manner that said drive gear is rotatable in sync therewith;
   providing a driven shaft that is rotatable along a second rotational path;
   providing and concentrically mating a driven gear about said driven shaft such that said driven gear is rotatable in sync therewith;
   said drive gear directly engaging said driven gear;
   rotating said driven shaft about said second rotational path by rotating said drive gear about the first rotational path; and
   pivoting said light-emitting sources along said first arcuate path by articulating said light-emitting sources to opposed positions defined interior and exterior of said housing respectively.

8. The method of claim 7, wherein step e comprises the steps of:
   providing and electrically coupling a motor to said controller;
   providing and attaching a drive shaft to said motor;
   providing and directly attaching a first beveled gear to an end of said drive shaft;
   providing and directly engaging a second beveled gear with said first beveled gear;
   providing and connecting a first stabilizing rod to said driven gear of said pivoting means by extending said first driven shaft upwardly therefrom;
   providing and engaging a ball and socket joint with a distal end of said first stabilizing rod;
   providing a support beam;
   directly coupling axially opposed proximal and distal ends of said support beam to said second beveled gear and one of said light-emitting sources respectively;
   synchronously rotating said motor with said drive shaft and said first beveled gear along a third rotational path;
   rotating said second beveled gear along a fourth rotational path defined orthogonal to said first rotational path; and
   swiveling said support beam along a corresponding one of said clockwise and counter clockwise directions.

9. The method of claim 8, the step of providing and engaging a ball and socket joint with a distal end of said first stabilizing rod comprising the steps of:
   providing a ball bearing including a protrusion continuously extending about an outer perimeter thereof;
   providing and disposing a socket at a distal end of said first stabilizing rod, said socket being provided with a continuous groove formed along an inner perimeter thereof;
   rotatably interfitting said protrusion within said groove; and
   synchronously rotating said support beam along the clockwise and counter clockwise directions while said first stabilizing rod remains statically engaged with said driven gear of said pivoting means.

\* \* \* \* \*